2 Sheets—Sheet 1.
J. MINIÉRE.
Umbrella-Frame.
No. 222,071. Patented Nov. 25, 1879.
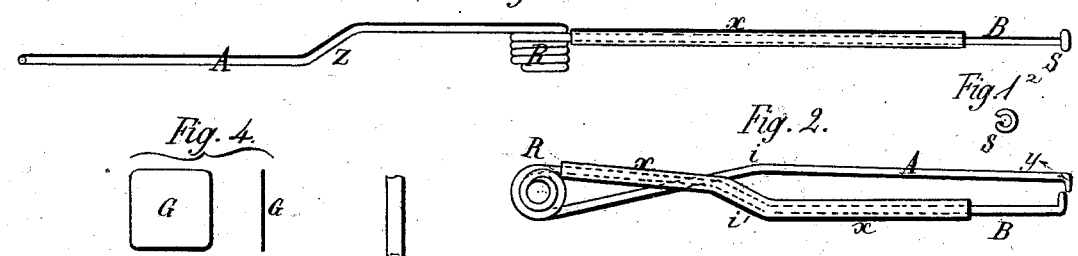
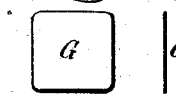
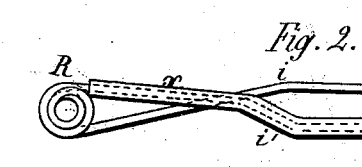
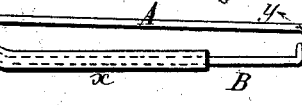
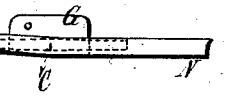
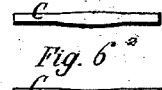
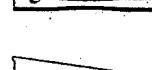
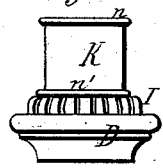
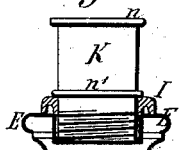
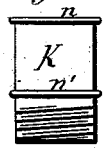
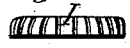
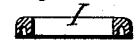
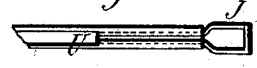
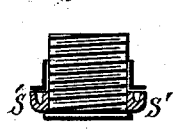
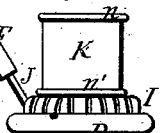
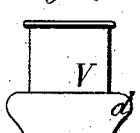
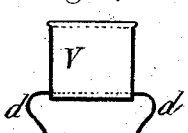
Witnesses:
Jules Miniéré
Inventor J. MINIÉRE.
Umbrella-Frame.
No. 222,071. Patented Nov. 25, 1879.
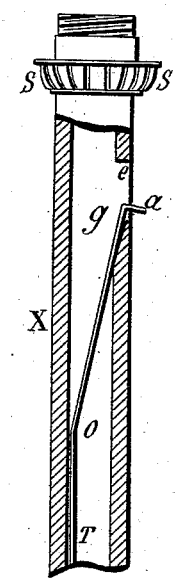
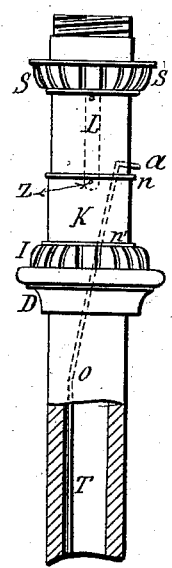
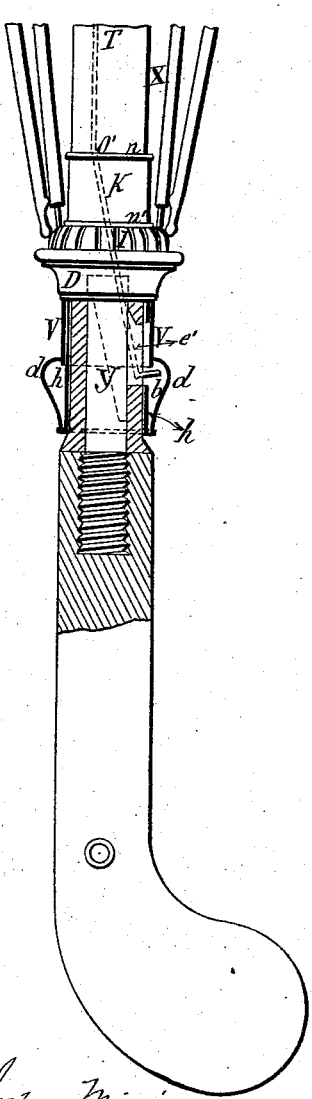
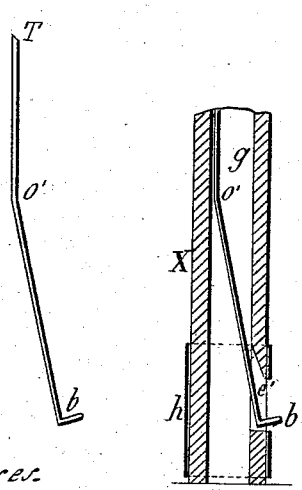
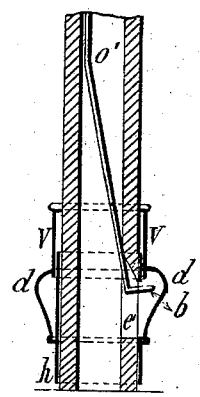

UNITED STATES PATENT OFFICE.

JULES MINIÈRE, OF PARIS, FRANCE.

IMPROVEMENT IN UMBRELLA-FRAMES.

Specification forming part of Letters Patent No. 222,071, dated November 25, 1879; application filed August 13, 1879.

*To all whom it may concern:*

Be it known that I, JULES MINIÈRE, of Paris, France, have invented a new Improvement in Umbrellas; and I do hereby declare the following, when taken in connection with the accompanying drawings and the letters of reference marked thereon, to be a full, clear, and exact description of the same, and which said drawings constitute part of this specification, and represent, in—

Figures 1 to 19, inclusive, details of construction and arrangement of the various parts, more particularly referred to hereinafter.

My invention relates to an improvement in umbrellas, the object being to facilitate opening and closing.

In a patent of May 27, 1879, I described an improved system of devices for automatically closing with one hand an umbrella or parasol, the result being obtained by springs acting on the stick and stretcher, and by a drawing mechanism serving to disengage the runner. I have given to that system the name of "Velox."

My present invention consists, first, in the ribs and stretchers, closed by springs, the operation of which is always the same; second, a new mode of hinging the stretcher on the rib; third, a new arrangement of runner, permitting the special agency of small loop on the stretcher; fourth, the arrangement of a simple steel wire at the interior of a hollow staff of wood or metal, in order to disengage the runner in the same manner as the mechanism already described, and as more fully hereinafter described, and particularly recited in the claims.

All these changes and improvements have in view the same result—that is to say, the automatic closing of the umbrella or parasol by one hand.

The annexed drawings, representing these improvements, with the description, present—

1. *Springs producing the automatic closing.*—Fig. 1, enlarged, represents a spiral spring, R, with two arms, A B, shown flat and free. The arm A, which extends from the spring R, is bent as at Z, so that in a part of its length it is in the plane of one side of the spring, and the remainder in the plane of the opposite side of the spring, so its extremity follows a direction perpendicular to the axis of the spring. The arm B is inclosed in a case or socket, $x$, made of steel, which gives the necessary rigidity, and ends in a transverse bend, to form a head, S, Fig. $1^2$.

Fig. 2, enlarged, shows a side view of the same spring R, the two arms brought together into their normal condition—that is, as when the umbrella is closed.

The arm A is slightly bent transversely at the point $i$, and terminates in a small hook, $y$, which enters a groove in the stretcher. The arm B, enveloped in its case or sheath $x$, is bent at the point $i'$, at a distance determined by the spring, so as not to interfere with the stretcher coming close to the rib when the umbrella is closed or opened.

Fig. 3 represents in full size the spring R, with its arms A B placed on the fork H of the stretcher F a short distance from the hinging-point G. It is in this position that the spring acts with most energy to rapidly produce the automatic closing of the umbrella. (Seen in Fig. 18.)

The arm A takes its bearing for the support of the stretcher in the groove of the stretcher, and in which it is held by the hooked extremity $y$.

The arm B, which is the movable part of the spring, is bound to the rib M N by its head S, and allowed to play freely in the groove formed by the C shape of the rib, (see $c\,d$, Fig. $3^2$, which is a transverse section of a rib.)

As will be seen, the spring R always acts the same way in order to produce the automatic closing of the umbrella by the tendency which the two arms A and B have to approach each other. In this figure the stretcher is shown perpendicular on the rib. This same form with two arms could be made with the spring having only a single twist or coil.

2. *Hinging of the stretcher on the rib.*—In order to form the hinging I use a steel plate, G, Fig. 4, which is bent as indicated in Figs. 5, $5^2$, and so that the lower part takes the interior form of the rib. I place it with this lower part in the groove of the branch and hold it there, arranging longitudinally therein the steel rod C, which projects at both ends, as seen in broken lines, Fig. 7. It is slightly flattened in the middle, Figs. 6 and $6^2$. This rod being thus arranged, I secure the ends by closing the rib thereon, or otherwise. By this means I avoid all roughness on the back of the rib.

The great length which I give to the two wings or sides of G compels the stretcher to follow the proper direction, and also prevents any deviation of the rib during the closing of the umbrella.

3. *The runner, having a screw with collar grooved on the inside to seize the groove, and small prongs in the form of stirrups, permitting the hinging of the stretcher with the runner.*—Figs. 8 and $8^2$ represent an elevation and a sectional view of the runner completely arranged and composed of three distinct parts:

First, the socket or tubular part K, which ends in a bead, $n$, and is outwardly screw-threaded at its opposite end, and near the screw-thread is an annular rib or shoulder, $n'$.

Second, a collar, I, having a groove in one edge, (see Fig. $10^2$,) and radial notches from said groove outward, (see Fig. 10,) corresponding to the number of stretchers.

Third, a cup-shaped nut, D, threaded on the inside, corresponding to the thread of the socket. In order to arrange these three pieces I place, first, the collar I on the socket K, passing it over the screw-thread; then screw on the nut D, clamping the collar I between the nut and the rib or shoulder $n'$.

The small loops J on the stretcher, Fig. 11, are made of round steel, which are properly bent and made flat on the two parallel sides. Their ends U are fastened in the stretcher. The loops J are engaged with the respective hooks on the collar I, (such hooks being the result of the groove and notches described,) and thereby form a strong hinge between the stretcher and runner. This arrangement dispenses with the wire usually employed to secure the end of the stretchers in the groove of the runner. When the loops J are properly arranged in the interior groove of the collar, then screw on the nut. By this means the stretchers are bound perfectly tight and hinged to the runner.

The same construction and arrangement may be applied to the top joint, S', as in Fig. 13, to hinge the ribs.

4. *Mechanism to start the runner for the closing movement.*—Fig. 14 shows the steel wire T, which I employ for drawing or starting the runner, and which is placed within the tubular (or may be a grooved) staff. This wire is bent outward at its two ends, as at $a$ and $b$, which ends extend outside the staff through grooves $e\ e'$. (See Fig. 15.) The bent form at the points $o$ and $o'$, near the ends, allows the wire to spring to the interior of the staff in such a way as to hold the hooks out through the grooves.

Fig. 15 shows the spring-piece T placed on the inside, $g$, of the hollow staff $x$. The end $a$, by being bent at $o$, is made to protrude through the groove $e$. The end $b$, bent at $o'$, is made to protrude through the groove $e'$. The hollow staff is of sufficient length to extend through the movable ferrule V when the umbrella is closed, and receives the handle, united thereto by means of a bolt, $y$, of wood or metal, as shown in Fig. 18 and detached in Fig. 19. That part of the bolt which enters the handle is slotted, so as not to hinder the operation of the wire T.

Finally, to complete it, the end of the handle which receives the bolt is introduced into a fixed ferrule, $h$, having a groove which coincides with the groove $e'$. The hollow handle may be continued beyond the movable ferrule. In this case the joined handle, also the fixed ferrule $h$, becomes unnecessary, and the handle terminates simply in a ball, a hook, or some ornament.

Fig. 16 represents the position of the wire T, the movable ferrule V, and the runner K when the umbrella is open. The end $b$ is completely concealed by the enlargement $d$ of the movable ferrule V, into which it enters and is held.

When the runner K is forced upward in opening, it strikes the end $a$ of the wire T. The flat spring L (seen in broken lines, Fig. 16) engages the runner, so as to hold it up, but yet yield for closing. An obstacle at $z$ arrests the runner when at its extreme height.

The handle of the ferrule V is longer than the length of the grooves $e\ e'$. The movable ferrule V (shown in part in elevation, Figs. 17 and $17^2$) is formed of two parts bound together by a clasp or hook. The first is a socket or tubular part, V, and the second is the circular enlargement $d$, under which the end $b$ of the wire T protrudes and is completely concealed. This enlargement permits the drawing of the ferrule. The function of this mechanism is to close the umbrella. It suffices to draw down the movable ferrule V, which engages with the end $b$ of the wire T, and forces the end $a$ to press on the runner K, and draw it away from the flat spring Z. Then the spring R operates to automatically close the umbrella.

Fig. 18 represents the umbrella closed.

I claim—

1. The combination of the ribs and stretchers of an umbrella with the U-shaped hinging-plate G, inserted in the groove of the rib, and secured therein by the longitudinal piece C, substantially as described.

2. The combination of the socket K, notched and grooved collar I, and nut D with the loop J on the runner end of the stretchers, substantially as described.

In testimony whereof I have signed my name to this specification before two subscribing witnesses.

JULES MINIÈRE.

Witnesses:
   ROBT. M. HOOPER,
   A. CABY.